(12) United States Patent
Kim et al.

(10) Patent No.: US 11,187,578 B1
(45) Date of Patent: Nov. 30, 2021

(54) SINGLE-PHOTON DETECTION METHOD AND APPARATUS

(71) Applicant: ELECTRONICS AND TELECOMMUNICATIONS RESEARCH INSTITUTE, Daejeon (KR)

(72) Inventors: Seok Kim, Daejeon (KR); Eun Ji Kim, Daejeon (KR); Younchang Jeong, Daejeon (KR); Osung Kwon, Daejeon (KR); Changho Hong, Daejeon (KR); Se Wan Ji, Daejeon (KR); Haeng-Seok Ko, Daejeon (KR); Jingak Jang, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/933,261

(22) Filed: Jul. 20, 2020

(30) Foreign Application Priority Data

Jun. 2, 2020  (KR) .................. 10-2020-0066361

(51) Int. Cl.
  *G01J 1/44* (2006.01)
(52) U.S. Cl.
  CPC ........... *G01J 1/44* (2013.01); *G01J 2001/442* (2013.01); *G01J 2001/4466* (2013.01)

(58) Field of Classification Search
  CPC .............. G01J 1/44; G01J 2001/442; G01J 2001/4466; G01J 2001/446; G01J 2001/4446; G01J 2001/444
  See application file for complete search history.

(56) References Cited

U.S. PATENT DOCUMENTS

| | | | | | |
|---|---|---|---|---|---|
| 3,225,213 | A | * | 12/1965 | Hinrichs | ............... H03K 5/084 327/58 |
| 4,356,389 | A | * | 10/1982 | Quirey | ............... G06K 7/10881 235/455 |
| 4,449,223 | A | * | 5/1984 | Liskov | ............. G01R 31/31708 375/226 |
| 4,799,243 | A | * | 1/1989 | Zepke | ..................... G07C 9/00 250/338.3 |
| 4,800,368 | A | * | 1/1989 | Wisner | ................ G08B 13/191 250/338.3 |
| 4,992,748 | A | * | 2/1991 | Gard | ....................... H03D 3/04 329/321 |

(Continued)

FOREIGN PATENT DOCUMENTS

| | | |
|---|---|---|
| CN | 103728030 A | 4/2014 |
| JP | 2003-243694 A | 8/2003 |

(Continued)

*Primary Examiner* — John R Lee
(74) *Attorney, Agent, or Firm* — LRK Patent Law Firm

(57) ABSTRACT

A single-photon detection method and apparatus. The single-photon detection method detects a single photon using a single-photon detection apparatus, and includes generating an output signal through a photon detector by receiving a light signal as an input, generating a negative voltage comparison result through a negative voltage comparator by receiving the output signal as an input, and generating a photon detection result based on the negative voltage comparison result.

15 Claims, 9 Drawing Sheets

(56) References Cited

U.S. PATENT DOCUMENTS

| | | | |
|---|---|---|---|
| 8,598,505 B2 | 12/2013 | Kang | |
| 2019/0335118 A1* | 10/2019 | Simolon | H04N 5/33 |
| 2019/0383916 A1* | 12/2019 | Gutnik | H03M 1/1215 |
| 2020/0244909 A1* | 7/2020 | Morimoto | H01L 27/14641 |
| 2020/0249143 A1* | 8/2020 | Takeuchi | G01N 15/06 |
| 2020/0252563 A1* | 8/2020 | Yasuda | H04N 5/343 |

FOREIGN PATENT DOCUMENTS

| | | |
|---|---|---|
| KR | 10-2011-0063251 A | 6/2011 |
| KR | 10-2013-0113656 A | 10/2013 |
| KR | 10-1331790 B1 | 11/2013 |
| KR | 10-2016-0048436 A | 5/2016 |

\* cited by examiner

SINGLE-PHOTON DETECTION METHOD AND APPARATUS

CROSS REFERENCE TO RELATED APPLICATION

This application claims the benefit of Korean Patent Application No. 10-2020-0066361, filed Jun. 2, 2020, which is hereby incorporated by reference in its entirety into this application.

BACKGROUND OF THE INVENTION

1. Technical Field

The present invention relates generally to a single-photon detection method and apparatus, and more particularly to single-photon detection technology that improves detection efficiency using an avalanche photodiode.

2. Description of Related Art

Unless a description is specifically made in the present specification, contents in this field are not admitted as conventional technology related to the disclosure of the accompanying claims in this application. Although the contents of specific technology are included in this field, the corresponding technology is not necessarily admitted as conventional technology.

Recently, in communication fields, quantum communication based on quantum mechanics has come to the fore as a new paradigm for a communication scheme.

Quantum communication fields may be classified into quantum cryptography communication, in which quantum key distribution and encryption are operated in conjunction with each other, and quantum direct communication, in which direct communication is performed using quanta without requiring a previously shared key.

FIG. 1 is a conceptual diagram of a quantum key distribution system for quantum cryptography communication.

Referring to FIG. 1, the quantum key distribution system for quantum cryptography communication, which is a representative applied example of quantum communication, may detect a pseudo-single-photon light source, generated by attenuated light emitted from a laser light source, and may then perform communication.

Here, IM denotes an intensity modulator, PM denotes a phase modulator, BS denotes a beam splitter, PBS denotes a polarizing beam splitter, and D1 and D2 denote single-photon detectors.

Since the performance of a quantum communication system is heavily dependent on the efficiency of single-photon detection, research into and development of single-photon detection technology have been actively conducted as core technology for implementing light-based quantum communication.

PRIOR ART DOCUMENTS

Patent Documents (Patent Document 1) Korean Patent No. 10-1685494, published Dec. 13, 2016 (also published as Korean Patent Application Publication No. 10-2016-0048436, published May 4, 2016)

SUMMARY OF THE INVENTION

Accordingly, the present invention has been made keeping in mind the above problems occurring in the prior art, and an object of the present invention is to provide a single-photon detection apparatus that can minimize the influence of a dark count and after-pulse noise.

Another object of the present invention is to provide a single-photon detection apparatus that can improve detection efficiency by minimizing the circuit modification of a conventional single-photon detection apparatus.

A further object of the present invention is to improve the deterioration of efficiency of single-photon detection caused by coupling noise.

Yet another object of the present invention is to improve the efficiency of single-photon detection by detecting the occurrence of a relatively low breakdown current.

Still another object of the present invention is to combine various types of single-photon detection schemes, comparatively analyze respective detection results, and then compare respective detection performance levels.

It is apparent that the objects of the present invention are not limited to the above-described objects, and other objects may also be derived from the following descriptions.

In accordance with an aspect of the present invention to accomplish the above objects, there is provided a single-photon detection apparatus, including a photon detector for generating an output signal by receiving a light signal as an input, a negative voltage comparator for generating a negative voltage comparison result by comparing the output signal with a preset negative reference voltage, and a result generation unit for generating a photon detection result based on the negative voltage comparison result.

The negative voltage comparator may generate the negative voltage comparison result by comparing the negative reference voltage with a negative voltage included in the output signal.

The single-photon detection apparatus may further include a positive voltage comparator for generating a positive voltage comparison result by comparing a positive voltage included in the output signal with a preset positive reference voltage, wherein the result generation unit may generate the photon detection result based on the negative voltage comparison result and the positive voltage comparison result.

The negative voltage comparison result may be defined as indicating that a photon has been detected when the negative voltage is higher than the negative reference voltage, and the positive voltage comparison result may be defined as indicating that a photon has been detected when the positive voltage is higher than the positive reference voltage.

The result generation unit may be configured to, when one or more of the negative voltage comparison result and the positive voltage comparison result are defined as indicating that a photon has been detected, generate the photon detection result indicating that the photon has been detected.

The photon detector may be an Avalanche Photodiode (APD).

The single-photon detection apparatus may further include a driver for applying a gate signal to the photon detector.

The gate signal may include a bias voltage lower than a breakdown voltage of the avalanche photodiode and a pulse voltage to be added to the bias voltage so that the gate signal voltage is periodically higher than the breakdown voltage.

In accordance with another aspect of the present invention to accomplish the above objects, there is provided a single-photon detection method for detecting a single photon using a single-photon detection apparatus, the method including generating an output signal through a photon detector by receiving a light signal as an input, generating a negative voltage comparison result through a negative voltage comparator by receiving the output signal as an input, and generating a photon detection result based on the negative voltage comparison result.

Generating the negative voltage comparison result may be configured to generate the negative voltage comparison result by comparing a negative reference voltage, preset in the negative voltage comparator, with a negative voltage included in the output signal.

The single-photon detection method may further include generating a positive voltage comparison result by comparing a positive reference voltage, preset in a positive voltage comparator, with a positive voltage included in the output signal through the positive voltage comparator, wherein generating the photon detection result may be configured to generate the photon detection result based on the negative voltage comparison result and the positive voltage comparison result.

The negative voltage comparison result may be defined as indicating that a photon has been detected when the negative voltage is higher than the negative reference voltage, and the positive voltage comparison result may be defined as indicating that a photon has been detected when the positive voltage is higher than the positive reference voltage.

Generating the photon detection result may be configured to, when one or more of the negative voltage comparison result and the positive voltage comparison result are defined as indicating that a photon has been detected, generate the photon detection result indicating that the photon has been detected.

The photon detector may be an Avalanche Photodiode (APD).

The single-photon detection method may further include applying a gate signal to the photon detector.

The gate signal may include a bias voltage lower than a breakdown voltage of the avalanche photodiode and a pulse voltage to be added to the bias voltage so that the gate signal voltage is periodically higher than the breakdown voltage.

In accordance with a further aspect of the present invention to accomplish the above objects, there is provided a single-photon detection apparatus, including one or more processors, and an execution memory for storing at least one program that is executed by the one or more processors, wherein the at least one program is configured to generate an output signal through a photon detector by receiving a light signal as an input, generate a negative voltage comparison result through a negative voltage comparator by receiving the output signal as an input, and generate a photon detection result based on the negative voltage comparison result.

The at least one program may be configured to generate the negative voltage comparison result by comparing a negative reference voltage, preset in the negative voltage comparator, with a negative voltage included in the output signal.

The at least one program may be configured to generate a positive voltage comparison result by comparing a positive reference voltage, preset in a positive voltage comparator, with a positive voltage included in the output signal, and generate the photon detection result based on the negative voltage comparison result and the positive voltage comparison result.

The negative voltage comparison result may be defined as indicating that a photon has been detected when the negative voltage is higher than the negative reference voltage, and the positive voltage comparison result may be defined as indicating that a photon has been detected when the positive voltage is higher than the positive reference voltage.

The at least one program may be configured to, when one or more of the negative voltage comparison result and the positive voltage comparison result are defined as indicating that a photon has been detected, generate the photon detection result indicating that the photon has been detected.

The photon detector may be an Avalanche Photodiode (APD).

The at least one program may apply a gate signal to the photon detector.

The gate signal may include a bias voltage lower than a breakdown voltage of the avalanche photodiode and a pulse voltage to be added to the bias voltage so that the gate signal voltage is periodically higher than the breakdown voltage.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
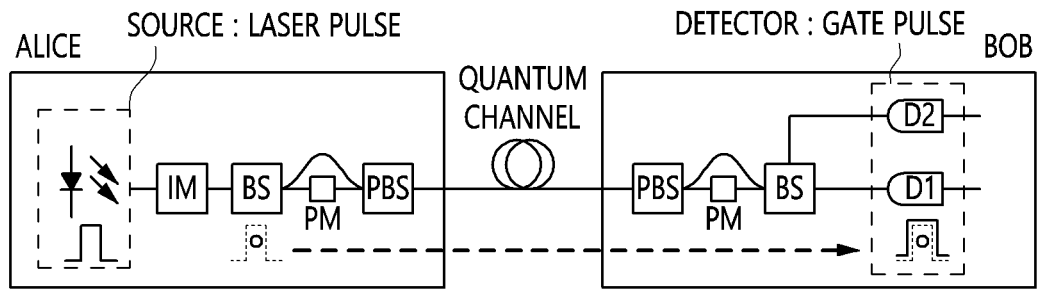
FIG. 1 is a conceptual diagram of a quantum key distribution system for quantum cryptography communication.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

A recent quantum cryptography system is configured such that an Avalanche Photodiode (APD) is used for a single-photon detection apparatus due to the advantages of the avalanche photodiode, such as the reduced size and low price thereof.

The avalanche photodiode is one of PN-junction photodetectors that absorb photon energy and form electron-hole pairs, and is characterized in that, unlike a PIN photodiode, in which the absorption of photon energy creates a single electron-hole pair, an electron-hole pair created through the absorption of photon energy is increased through a gain mechanism therein to multiple electron-hole pairs, which are then emitted from the avalanche photodiode, thus increasing the sensitivity thereof.

Such an avalanche photodiode may be made of materials such as Si, Ge, and InGaAs/InP depending on the wavelength of a photon desired to be detected.

The avalanche photodiode may be operated in a Geiger mode, in which an internal gain is close to infinity, so as to secure the detection efficiency of photons in a quantum cryptography system.

Here, the Geiger mode is an operating scheme in which a reverse voltage higher than a breakdown voltage is applied to the avalanche photodiode. In the Geiger mode, the strength of an electric field on a multiplication layer of the avalanche photodiode is increased. Accordingly, even if a small number of photons are absorbed, a macroscopic current pulse is output due to the breakdown of an avalanche current, thus enabling a single photon to be detected.

Also, there is the case where a single-photon detection apparatus occasionally counts photons by autonomously producing an avalanche pulse by itself even if photons are not input, and this case is referred to as a "dark count".

Here, the dark count may be caused when charges are thermally excited in the avalanche photodiode, when tunneling occurs, or when trapped charges are emitted.

The single-photon detection apparatus may utilize a gate mode together with the Geiger mode in order to minimize the influence of the dark count and maximize detection efficiency in the Geiger mode.

Here, the gate mode is a scheme in which a voltage higher than a breakdown voltage is instantaneously applied to the avalanche photodiode by adding a very short pulse voltage at the same time that a reverse voltage lower than the breakdown voltage is applied to the avalanche photodiode (hereinafter, a signal obtained by adding the reverse voltage lower than the breakdown voltage to the pulse voltage is referred to as a "gate signal").

In the single-photon detection apparatus operating in the gate mode, the voltage to be applied to the avalanche photodiode is periodically higher than the breakdown voltage in response to the gate signal only during the time in which the pulse is input, in which case only absorbed photons may be detected, and thus the influence of noise may be minimized.

Figure 2:
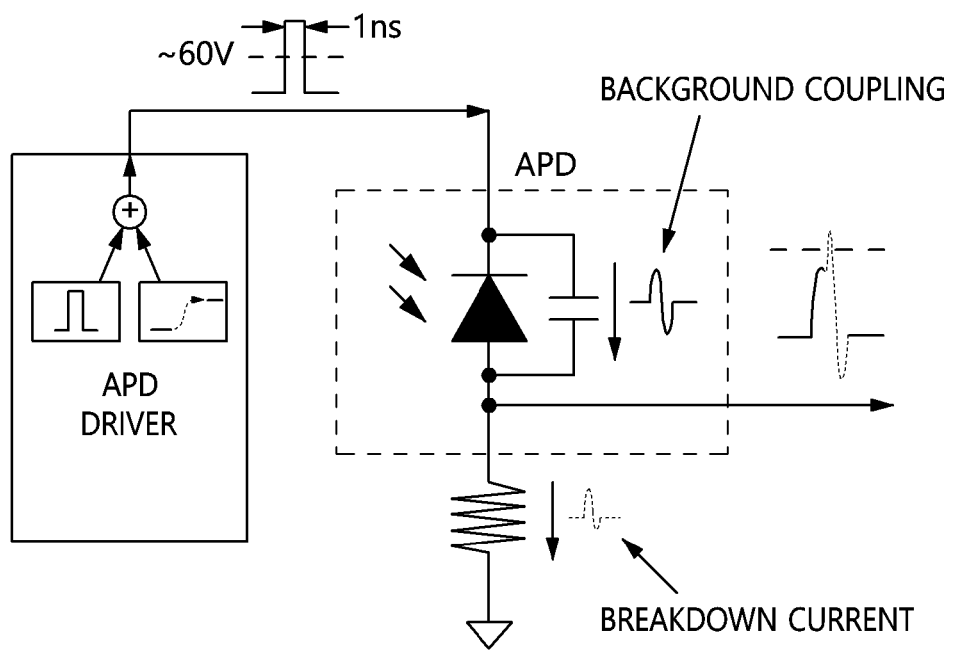
FIG. 2 is a configuration diagram illustrating a procedure for generating the output signal of a typical avalanche photodiode.

FIG. 2 is a configuration diagram illustrating a procedure for generating the output signal of a typical avalanche photodiode.

Referring to FIG. 2, a typical gate-mode single-photon detection apparatus may include an avalanche photodiode (APD) driver for inputting a gate signal, an avalanche photodiode, an arbitrary resistor, etc.

Here, in order to minimize the occurrence of a dark count, the APD driver may generate a gate signal so that a voltage equal to or higher than a breakdown voltage is applied to the avalanche photodiode only during the time in which a single photon is incident.

Here, the gate signal includes a DC bias voltage lower than the breakdown voltage of the avalanche photodiode and a pulse signal to be added to the bias voltage so that the gate signal voltage is periodically higher than the breakdown voltage at a regular period. The gate signal may be applied to the cathode of the avalanche photodiode.

Here, when a photon is incident on the avalanche photodiode, a breakdown current is produced at the anode of the avalanche photodiode, and whether the photon has been incident may be detected based on the production of the breakdown current.

In the typical gate-mode single-photon detection apparatus, during the procedure for applying the pulse signal, coupling noise (background noise or background coupling) may occur due to parasitic capacitance within the avalanche photodiode.

The coupling noise makes it difficult to detect a breakdown current because the coupling noise occurs at a time that temporally overlaps the occurrence of the breakdown current, thus deteriorating photon detection efficiency.

Figure 3:
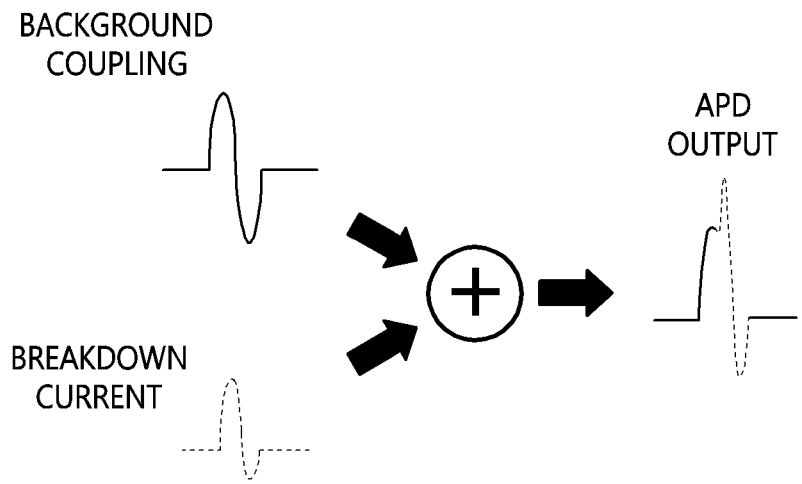
FIG. 3 is a conceptual diagram illustrating a procedure for generating the output signal of an avalanche photodiode depending on coupling noise and a breakdown current.

FIG. 3 is a conceptual diagram illustrating a procedure for generating an output signal depending on coupling noise and a breakdown current.

Referring to FIG. 3, coupling noise and a breakdown current caused by parasitic capacitance are summed, and then the output signal of an avalanche photodiode is generated.

Here, the output signal may be a node voltage between the anode of the avalanche photodiode and an arbitrary resistor connected to a ground GND.

Figure 4:
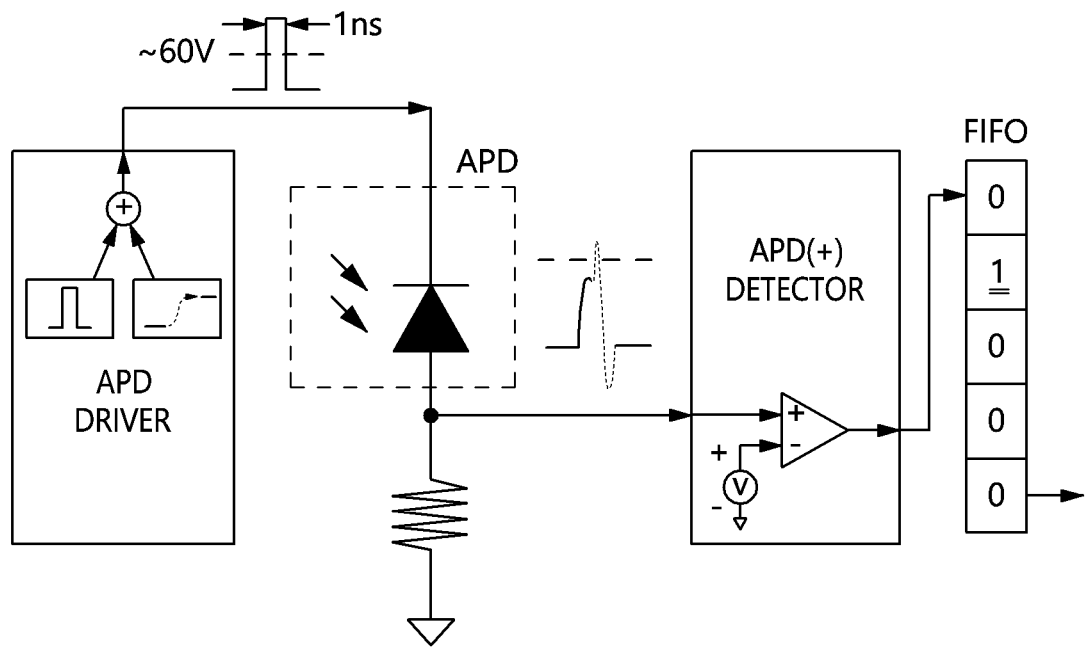
FIG. 4 is a configuration diagram illustrating a single-photon detection process performed by a conventional single-photon detection apparatus.

FIG. 4 is a configuration diagram illustrating a single-photon detection process performed by a conventional single-photon detection apparatus.

Referring to FIG. 4, a typical gate-mode single-photon detection apparatus may include an avalanche photodiode (APD) driver for inputting a gate signal, an avalanche photodiode (APD), an APD(+) detector (or an APD detector or a positive voltage comparator), an arbitrary resistor, etc.

When a photon is incident on the avalanche photodiode, a breakdown current may be produced at the anode of the avalanche photodiode. The APD(+) detector may compare the output signal of the avalanche photodiode based on the breakdown current with a preset reference voltage, and may then convert a comparison result into a digital logic signal.

Here, the APD(+) detector may be used as a kind of comparator, may preset a reference voltage (positive reference voltage) exceeding coupling noise, and may compare the output signal of the avalanche photodiode caused by the photon with the reference voltage (positive reference voltage). Then, the APD(+) detector may generate a bit stream configured such that, when the output signal is greater than the positive reference voltage, '1' is output, whereas when the output signal is not greater than the positive reference voltage, '0' is output.

Figure 5:
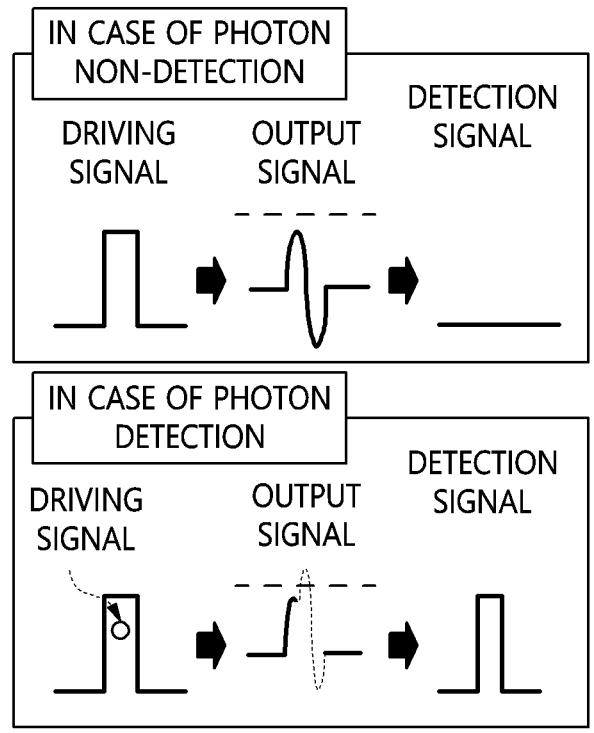
FIG. 5 is a conceptual diagram illustrating the operating principle of the conventional single-photon detection apparatus.

FIG. 5 is a conceptual diagram illustrating the operating principle of the conventional single-photon detection apparatus.

Referring to FIG. 5, when a photon is not detected, the conventional single-photon detection apparatus does not generate a detection signal because the output signal corresponding to a driving signal does not exceed a reference voltage (positive reference voltage) of an APD(+) detector.

Further, when a photon is detected, the conventional single-photon detection apparatus generates a detection signal because the output signal corresponding to the driving signal exceeds the reference voltage (positive reference voltage) of the APD(+) detector.

In summary, the conventional single-photon detection apparatus may read a change in the output signal depending on whether a photon is present, and may then determine whether a photon has been detected.

Figure 6:
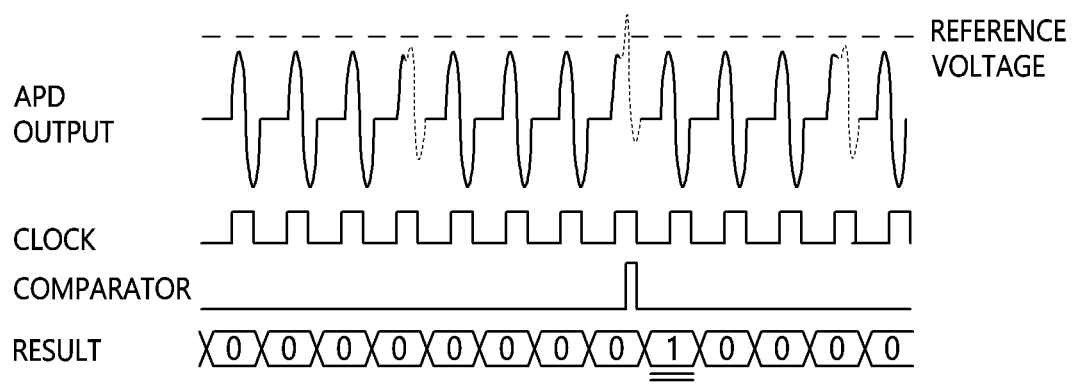
FIG. 6 is a conceptual diagram illustrating photon detection based on a positive reference voltage by the conventional single-photon detection apparatus.

FIG. 6 is a conceptual diagram illustrating photon detection based on a positive reference voltage by the conventional single-photon detection apparatus.

Referring to FIG. 6, the conventional single-photon detection apparatus may set a positive reference voltage exceeding coupling noise, extract the output voltage of an avalanche photodiode, which is increased by the photon, and then determine whether the photon has been detected.

However, as illustrated in FIG. 6, the conventional single-photon detection apparatus is problematic in that there occurs the case where, even if a breakdown current caused by a photon has been produced, the output voltage of the avalanche photodiode does not exceed the positive reference voltage, thus slightly decreasing detection efficiency.

Figure 7:
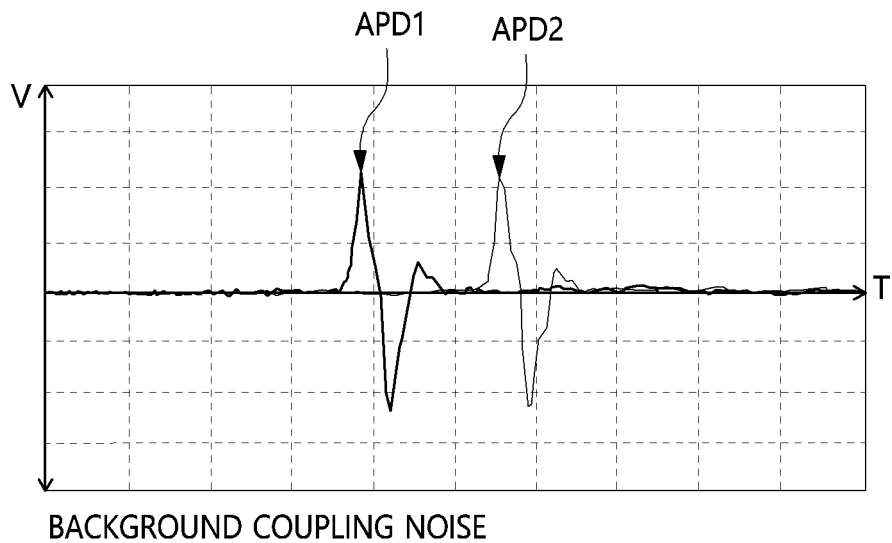
FIG. 7 is a graph showing coupling noise of a typical avalanche photodiode.
Figure 8:
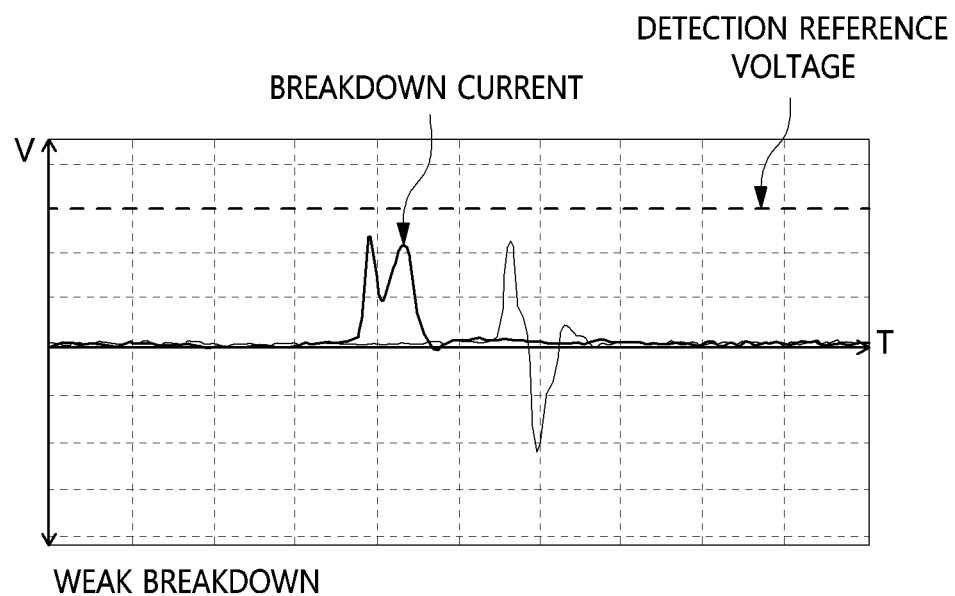
FIG. 8 is a graph showing the case where a breakdown current caused by a photon is hidden by coupling noise.
Figure 9:
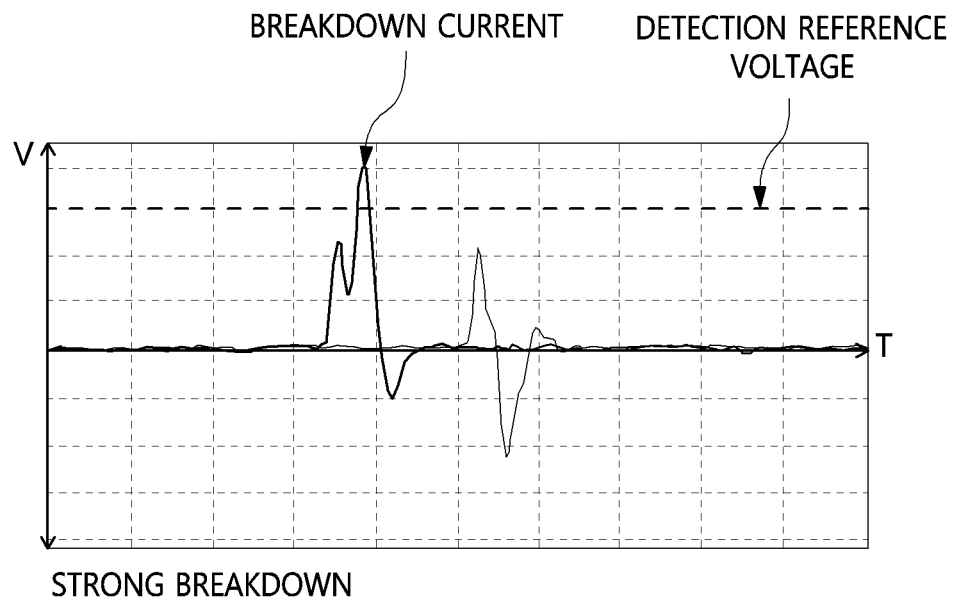
FIG. 9 is a graph showing the case where a breakdown current caused by a photon exceeds coupling noise.

FIG. 7 is a graph showing coupling noise of an avalanche photodiode to which a gate signal is applied, FIG. 8 is a graph showing the case where a breakdown current caused by a photon is hidden by coupling noise, and FIG. 9 is a graph showing the case where a breakdown current caused by a photon exceeds coupling noise.

Referring to FIG. 7, APD1 and APD2 show that coupling noise is measured depending on the application of a gate signal regardless of whether a photon has been detected, wherein a reference voltage is set for photon detection and is preferably set to a value greater than the coupling noise.

Referring to FIG. 8, APD1 shows that a photon has been detected and that a breakdown current has been produced in the avalanche photodiode, but is hidden by coupling noise, and thus photon detection may not be confirmed.

Referring to FIG. 9, APD1 shows that, when a photon has been detected and a breakdown current above a predetermined level is produced at the avalanche photodiode, the photon detection may be confirmed because the breakdown current exceeds the coupling noise and the reference voltage.

In this way, as illustrated in FIG. 8, the conventional single-photon detection apparatus may not positively confirm the photon detection in spite of the occurrence of a breakdown current, thus deteriorating the overall detection efficiency.

Figure 10:
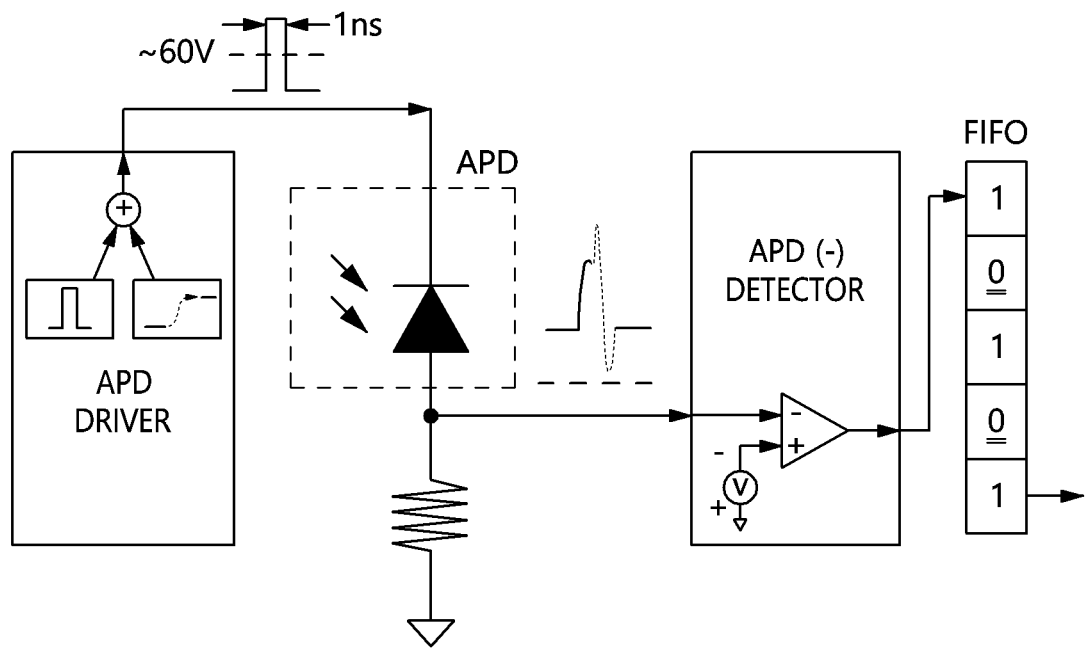
FIG. 10 is a configuration diagram of a single-photon detection apparatus to which a negative reference voltage is applied according to an embodiment of the present invention.

FIG. 10 is a configuration diagram of a single-photon detection apparatus to which a negative reference voltage is applied according to an embodiment of the present invention.

Referring to FIG. 10, the single-photon detection apparatus to which the negative reference voltage is applied according to the embodiment of the present invention may include an avalanche photodiode (APD) driver, an avalanche photodiode, an APD(−) detector (i.e., a negative voltage comparator), and an arbitrary resistor in order to solve the above-described problems.

Here, the APD(−) detector (i.e., negative voltage comparator) may preset a negative reference voltage that is higher than the negative voltage of the coupling noise but lower than the output signal caused by a photon, and may compare the output signal of the avalanche photodiode caused by the photon with the negative reference voltage. Then, the APD(−) detector may generate a bit stream configured such that, when the output signal is greater than the negative reference voltage, '0' is output, whereas when the output signal is not greater than the negative reference voltage, '1' is output.

In this case, the single-photon detection apparatus to which a negative reference voltage is applied according to an embodiment of the present invention may positively confirm the photon detection due to a change in a negative voltage even if a breakdown current caused by photon detection is hidden by coupling noise. This operation will be described in detail below with reference to FIG. 11.

Figure 11:
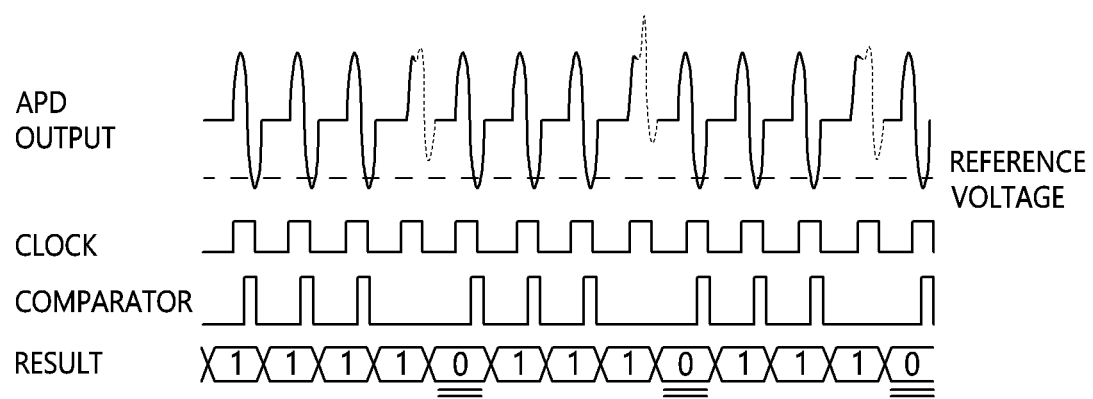
FIG. 11 is a conceptual diagram illustrating photon detection based on a negative reference voltage according to an embodiment of the present invention.

FIG. 11 is a conceptual diagram illustrating photon detection based on a negative reference voltage according to an embodiment of the present invention.

Referring to FIG. 11, as described above, the output signal of the avalanche photodiode (APD output) appears as the sum of coupling noise and a breakdown current. The breakdown current may be produced such that the output voltage of the avalanche photodiode is increased.

In this case, a conventional single-photon detection scheme has slightly low photon detection efficiency because, as illustrated in FIG. 4, there may also be the case where an output voltage of the avalanche photodiode does not exceed a reference voltage even if a breakdown current caused by a photon has been produced.

Here, when a negative output voltage of the avalanche photodiode is considered, it can be seen that the magnitude of negative coupling noise is reduced along with the production of a breakdown current.

Therefore, the single-photon detection apparatus according to the embodiment of the present invention, illustrated in FIG. 11, may set a reference voltage (i.e., a negative reference voltage) that is higher than a negative output voltage caused by the occurrence of coupling noise but lower than a negative output voltage caused by the production of a breakdown current.

Here, as illustrated in FIG. 11, the single-photon detection apparatus according to the embodiment of the present invention may be configured to compare the negative output voltage of the avalanche photodiode with the negative reference voltage through a negative voltage comparator and to output a value of '0' only when a breakdown current is produced.

In summary, the conventional single-photon detection apparatus may detect a breakdown current only when the magnitude of the breakdown current is equal to or greater than coupling noise, whereas the single-photon detection apparatus according to the embodiment of the present invention, illustrated in FIG. 11, may detect the production of even a breakdown current having a relatively small magnitude because negative coupling noise is decreased when the breakdown current is produced.

Therefore, the deterioration of efficiency of single-photon detection caused by coupling noise may be improved, and the production of a relatively low breakdown current may be detected, and thus the efficiency of single-photon detection may be improved.

By reducing the effect of coupling noise, a single-photon detection apparatus having the same efficiency may be implemented with a lower driving voltage, which also enables after-pulse noise to be reduced.

Here, the reduction of after-pulse noise is required not only for the suppression of errors in the single-photon detection apparatus, but also for the high-speed operation of the single-photon detection apparatus.

Figure 12:
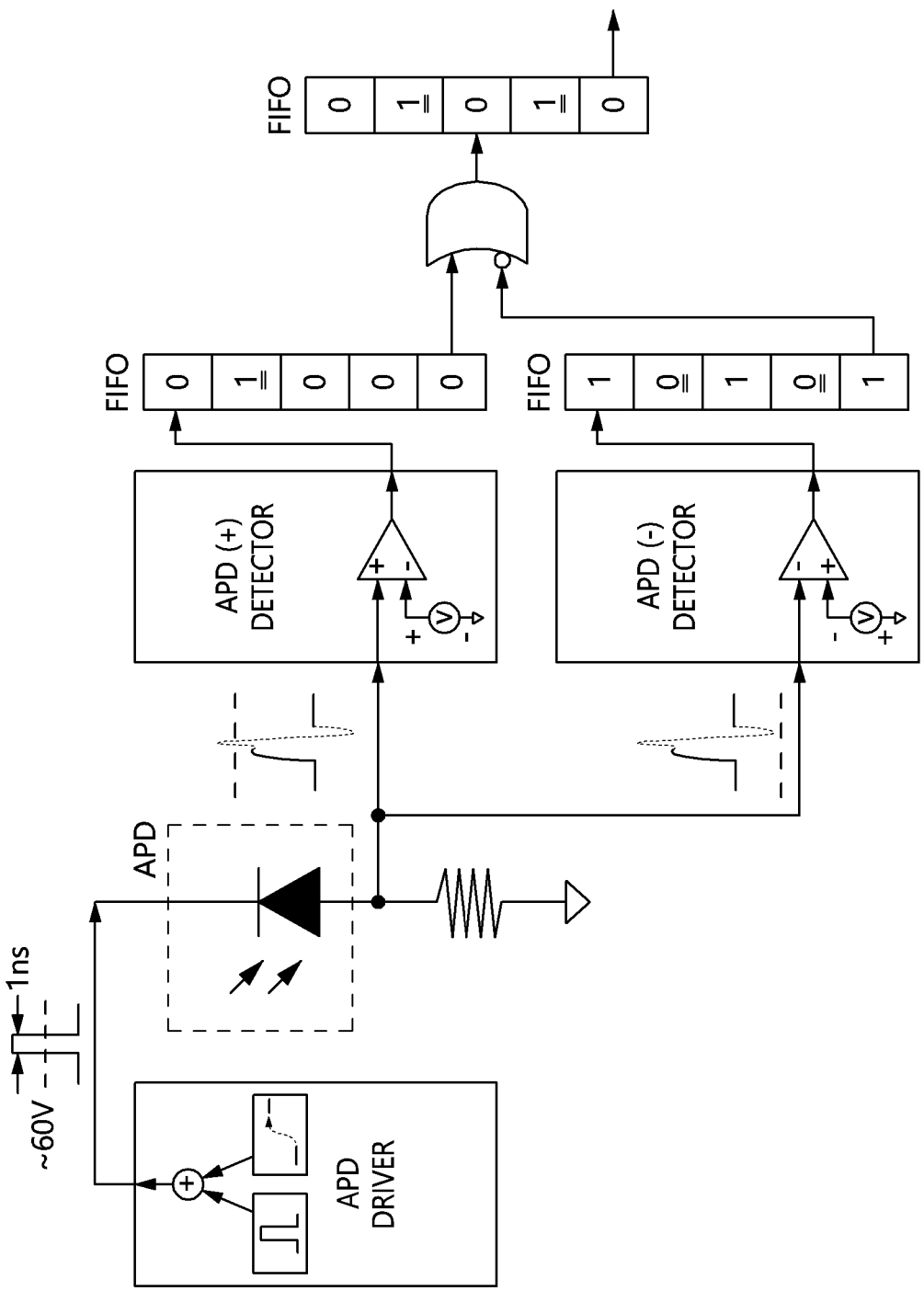
FIG. 12 is a configuration diagram of a single-photon detection apparatus to which a negative reference voltage and a positive reference voltage are simultaneously applied according to an embodiment of the present invention.

FIG. 12 is a configuration diagram of a single-photon detection apparatus to which a negative reference voltage and a positive reference voltage are simultaneously applied according to an embodiment of the present invention.

Referring to FIG. 12, the single-photon detection apparatus according to the embodiment of the present invention may utilize the conventional single-photon detection apparatus to which a positive reference voltage is applied, together with the single-photon detection apparatus to which a negative reference voltage is applied according to the above-described embodiment, in order to simultaneously secure efficiency and safety in photon detection.

The single-photon detection apparatus according to the embodiment of the present invention may include an avalanche photodiode (APD) driver, an avalanche photodiode, an APD(−) detector (i.e., a negative voltage comparator), an APD(+) detector (i.e., a positive voltage comparator), and an arbitrary resistor.

The APD(−) detector (negative voltage comparator) may set a negative reference voltage, determine whether a photon has been detected by comparing the negative reference voltage with a negative voltage included in the output signal of the avalanche photodiode, and generate a bitstream in which the detection of a photon is set to '0' and the non-detection of a photon is set to '1'.

The APD(+) detector (positive voltage comparator) may set a positive reference voltage, determine whether a photon has been detected by comparing the positive reference voltage with a positive voltage included in the output signal of the avalanche photodiode, and generate a bitstream in which the detection of a photon is set to '1' and the non-detection of a photon is set to '0'.

The single-photon detection apparatus according to the embodiment of the present invention may aggregate (combine) the bit stream of the APD(−) detector (negative voltage comparator) and the bit stream of the APD(+) detector (positive voltage comparator), thus generating a photon detection result.

Here, the single-photon detection apparatus according to the embodiment of the present invention may be simply implemented by attaching the APD(−) detector (negative voltage comparator) to the output terminal of the conventional single-photon detection apparatus.

Here, the APD(−) detector (negative voltage comparator) may be simply implemented by changing only the input polarity and the reference voltage of the conventional APD (+) detector (positive voltage comparator).

Therefore, the single-photon detection apparatus according to an embodiment of the present invention may be implemented so as to improve the efficiency of the conventional single-photon detection apparatus at minimum additional cost.

Further, the single-photon detection apparatus according to an embodiment of the present invention may separately collect photon detection results respectively obtained by the APD(−) detector (negative voltage comparator) and the APD(+) detector (positive voltage comparator), and may comparatively analyze the detection performance thereof based on respective single-photon detection schemes by comparing the photon detection results with each other.

Figure 13:
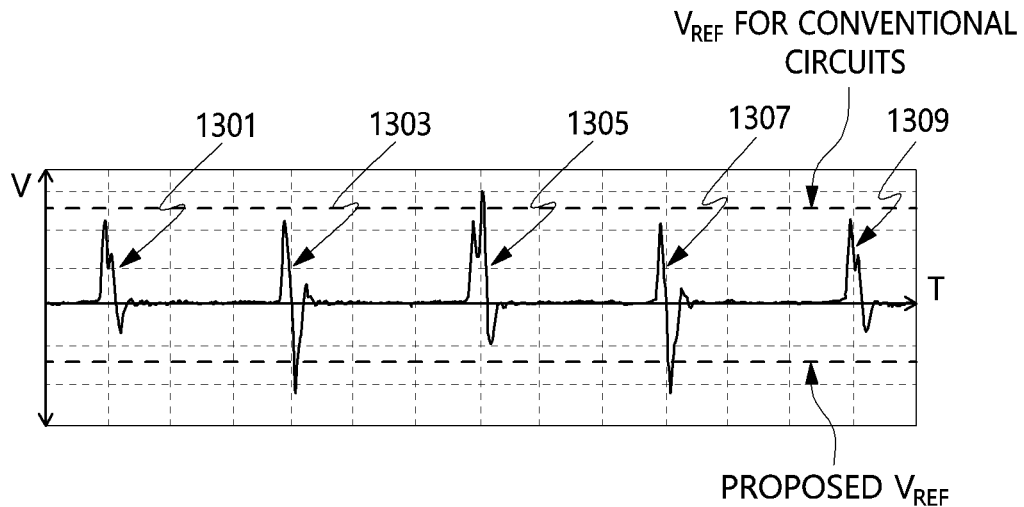
FIG. 13 is a graph showing a comparison between a photon detection process based on the output signal of an avalanche photodiode and a positive reference voltage and a photon detection process based on the output signal and a negative reference voltage.

FIG. 13 is a graph showing output waveforms according to an embodiment of the present invention.

Referring to FIG. 13, the single-photon detection apparatus according to an embodiment of the present invention may set together a positive reference voltage, such as that of a conventional single-photon detection apparatus, and a negative reference voltage, such as that of the present invention, and may then measure the output signal of an avalanche photodiode.

Here, the single-photon detection apparatus according to the embodiment of the present invention may detect a breakdown current from waveform 1305 based on the positive reference voltage, may detect a breakdown current from waveforms 1301, 1305, and 1309 based on the negative reference voltage, and may generate a photon detection result by aggregating the detection results based on the positive reference voltage and the negative reference voltage.

Here, the single-photon detection apparatus according to the embodiment of the present invention may also detect a photon based on a negative reference voltage even when a breakdown current lower than that of the conventional single-photon detection apparatus is produced.

Figure 14:
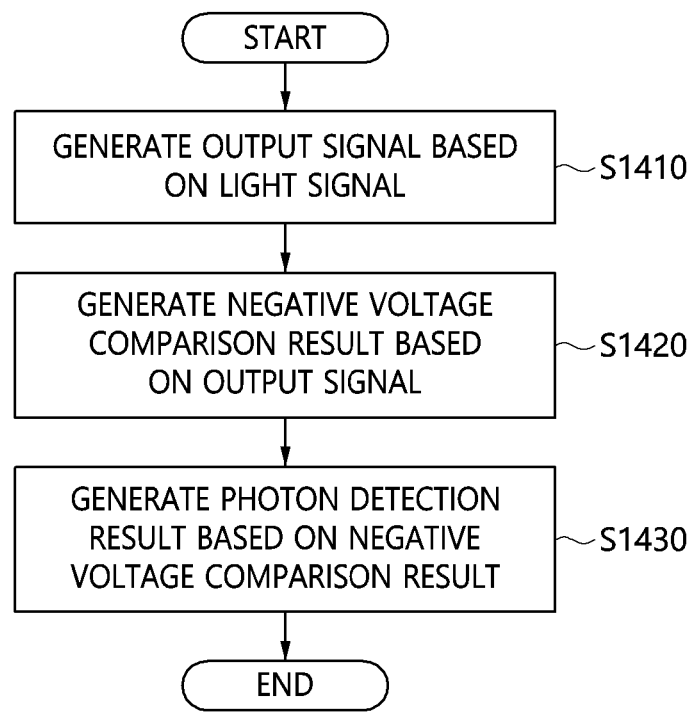
FIG. 14 is a flowchart illustrating a single-photon detection method according to an embodiment of the present invention.

FIG. 14 is an operation flowchart illustrating a single-photon detection method according to an embodiment of the present invention.

Referring to FIG. 14, the single-photon detection method according to the embodiment of the present invention generates an output signal through a photon detector by receiving a light signal as an input, at step S1410.

Next, the single-photon detection method according to the embodiment of the present invention generates a negative voltage comparison result through a negative voltage comparator by receiving the output signal as an input at step S1420.

Further, the single-photon detection method according to the embodiment of the present invention generates a photon detection result based on the negative voltage comparison result at step S1430.

Here, at step S1420, the negative voltage comparison result may be generated by comparing a negative reference voltage preset in the negative voltage comparator with a negative voltage included in the output signal.

The single-photon detection method according to the embodiment of the present invention may further include the step of generating a positive voltage comparison result by comparing a positive reference voltage preset in a positive voltage comparator with a positive voltage included in the output signal.

Here, at step S1430, the photon detection result may be generated based on the negative voltage comparison result and the positive voltage comparison result.

The negative voltage comparison result may be defined as indicating that a photon has been detected when the negative voltage is higher than the negative reference voltage, and the positive voltage comparison result may be defined as indicating that a photon has been detected when the positive voltage is higher than the positive reference voltage.

Here, at step S1430, when one or more of the negative voltage comparison result and the positive voltage comparison result are defined as indicating that a photon has been detected, a photon detection result indicating that the photon has been detected may be generated.

The photon detector may be an avalanche photodiode (APD).

The single-photon detection method according to the embodiment of the present invention may further include the step of inputting a gate signal to the photon detector.

Here, the gate signal may include a bias voltage, lower than the breakdown voltage of the avalanche photodiode, and a pulse voltage to be added to the bias voltage so that the gate signal voltage is periodically higher than the breakdown voltage.

Figure 15:
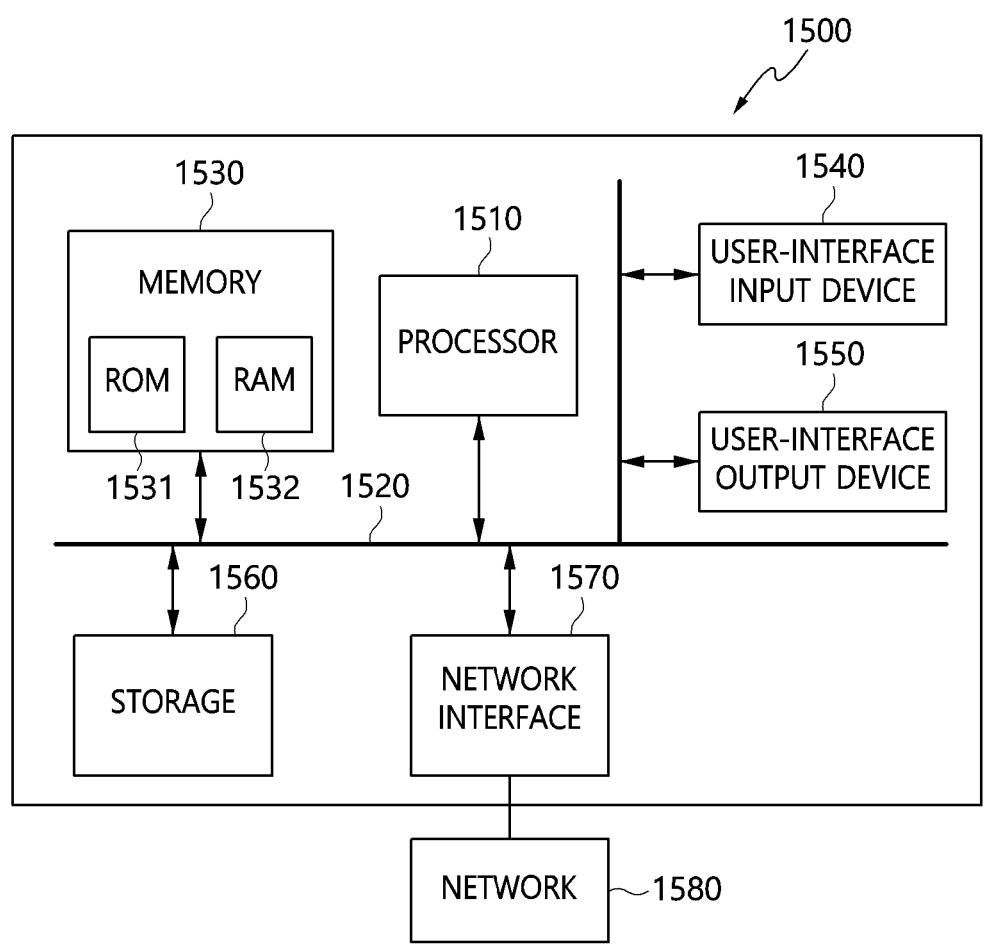
FIG. 15 is a diagram illustrating a computer system according to an embodiment of the present invention.

FIG. 15 is a diagram illustrating a computer system according to an embodiment of the present invention.

Referring to FIG. 15, the embodiment of the present invention may be implemented in a computer system 1500, such as a computer-readable storage medium. As illustrated in FIG. 15, the computer system 1500 may include one or more processors 1510, memory 1530, a user interface input device 1540, a user interface output device 1550, and storage 1560, which communicate with each other through a bus 1520. The computer system 1500 may further include a network interface 1570 connected to a network 1580. Each processor 1510 may be a Central Processing Unit (CPU) or a semiconductor device for executing processing instructions stored in the memory 1530 or the storage 1560. Each of the memory 1530 and the storage 1560 may be any of various types of volatile or nonvolatile storage media. For example, the memory 1530 may include Read-Only Memory (ROM) 1531 or Random Access Memory (RAM) 1532.

Here, a single-photon detection apparatus according to an embodiment of the present invention may include one or more processors and execution memory for storing at least one program that is executed by the one or more processors, wherein the at least one program is configured to generate an output signal through a photon detector by receiving a light signal as an input, generate a negative voltage comparison result through a negative voltage comparator by receiving the output signal as an input, and generate a photon detection result based on the negative voltage comparison result.

Here, the at least one program may be configured to generate the negative voltage comparison result by comparing a negative reference voltage, preset in the negative voltage comparator, with a negative voltage included in the output signal.

Here, the at least one program may be configured to generate a positive voltage comparison result by comparing a positive reference voltage, preset in a positive voltage comparator, with a positive voltage included in the output signal, and generate the photon detection result based on the negative voltage comparison result and the positive voltage comparison result.

Here, the negative voltage comparison result may be defined as indicating that a photon has been detected when the negative voltage is higher than the negative reference voltage, and the positive voltage comparison result may be defined as indicating that a photon has been detected when the positive voltage is higher than the positive reference voltage.

Here, the at least one program may be configured to, when one or more of the negative voltage comparison result and the positive voltage comparison result are defined as indicating that a photon has been detected, generate the photon detection result indicating that the photon has been detected.

Here, the photon detector may be an Avalanche Photodiode (APD).

Here, the at least one program may apply a gate signal to the photon detector.

Here, the gate signal may include a bias voltage lower than a breakdown voltage of the avalanche photodiode and a pulse voltage to be added to the bias voltage so that the gate signal voltage is periodically higher than the breakdown voltage.

Therefore, the embodiment of the present invention may be implemented as a non-transitory computer-readable medium in which computer-implemented methods or computer-executable instructions are recorded. When the computer-executable instructions are executed by the processors, the computer-executable instructions may perform the method according to at least one aspect of the present invention.

In accordance with the present invention, there can be provided a single-photon detection apparatus that may minimize the influence of a dark count and after-pulse noise.

Further, in accordance with the present invention, there can be provided a single-photon detection apparatus that may improve detection efficiency by minimizing the circuit modification of a conventional single-photon detection apparatus.

Furthermore, in accordance with the present invention, the deterioration of efficiency of single-photon detection caused by coupling noise may be improved.

Furthermore, in accordance with the present invention, the efficiency of single-photon detection may be improved by detecting the occurrence of a relatively low breakdown current Furthermore, in accordance with the present invention, various types of single-photon detection schemes may be combined, respective detection results may be comparatively analyzed, and then respective detection performance levels may be compared with each other.

The effects of the present embodiments are not limited to the above-described effects, and other effects, not described, may be definitely understood by those skilled in the art from the description of the accompanying claims.

As described above, in the single-photon detection method and apparatus according to the present invention, the configurations and schemes in the above-described embodiments are not limitedly applied, and some or all of the above embodiments can be selectively combined and configured such that various modifications are possible.

What is claimed is:

1. A single-photon detection apparatus in an optical quantum communication system, comprising:
   a photon detector for generating an output signal from an incoming light signal to detect a photon;
   a negative voltage comparator for generating a negative voltage comparison result by comparing a negative voltage included in the output signal with a preset negative reference voltage; and
   a result generation unit for generating a photon detection result based on the negative voltage comparison result,
   wherein when a breakdown current of the photon detector is produced, a photon detection result indicating that a photon has been detected is generated due to a change in the negative voltage of the output signal.

2. The single-photon detection apparatus of claim 1, further comprising a positive voltage comparator for generating a positive voltage comparison result by comparing a positive voltage included in the output signal with a preset positive reference voltage,
   wherein the result generation unit generates the photon detection result based on the negative voltage comparison result and the positive voltage comparison result.

3. The single-photon detection apparatus of claim 2, wherein:
the negative voltage comparison result is defined as indicating that a photon has been detected when the negative voltage is higher than the negative reference voltage, and
the positive voltage comparison result is defined as indicating that a photon has been detected when the positive voltage is higher than the positive reference voltage.

4. The single-photon detection apparatus of claim 3, wherein the result generation unit is configured to, when one or more of the negative voltage comparison result and the positive voltage comparison result are defined as indicating that a photon has been detected, generate the photon detection result indicating that the photon has been detected.

5. The single-photon detection apparatus of claim 1, wherein the photon detector is an Avalanche Photodiode (APD).

6. The single-photon detection apparatus of claim 5, further comprising a driver for applying a gate signal to the photon detector.

7. The single-photon detection apparatus of claim 6, wherein the gate signal includes a bias voltage lower than a breakdown voltage of the avalanche photodiode and a pulse voltage to be added to the bias voltage such that the gate signal periodically has a higher voltage than the breakdown voltage only during a period of time in which the pulse voltage is added.

8. A single-photon detection method for detecting a single photon using a single-photon detection apparatus in an optical quantum communication system, the single-photon detection method comprising:
generating an output signal through a photon detector from an incoming light signal to detect a photon;
generating a negative voltage comparison result through a negative voltage comparator by comparing a negative reference voltage, which is preset in the negative voltage comparator, with a negative voltage included in the output signal; and
generating a photon detection result based on the negative voltage comparison result,
wherein when a breakdown current of the photon detector is produced, a photon detection result indicating that a photon has been detected is generated due to a change in the negative voltage of the output signal.

9. The single-photon detection method of claim 8, further comprising:
generating a positive voltage comparison result by comparing a positive reference voltage, preset in a positive voltage comparator, with a positive voltage included in the output signal through the positive voltage comparator,
wherein generating the photon detection result is configured to generate the photon detection result based on the negative voltage comparison result and the positive voltage comparison result.

10. The single-photon detection method of claim 9, wherein:
the negative voltage comparison result is defined as indicating that a photon has been detected when the negative voltage is higher than the negative reference voltage, and
the positive voltage comparison result is defined as indicating that a photon has been detected when the positive voltage is higher than the positive reference voltage.

11. The single-photon detection method of claim 10, wherein generating the photon detection result is configured to, when one or more of the negative voltage comparison result and the positive voltage comparison result are defined as indicating that a photon has been detected, generate the photon detection result indicating that the photon has been detected.

12. The single-photon detection method of claim 8, wherein the photon detector is an Avalanche Photodiode (APD).

13. The single-photon detection method of claim 12, further comprising applying a gate signal to the photon detector.

14. The single-photon detection method of claim 13, wherein the gate signal includes a bias voltage lower than a breakdown voltage of the avalanche photodiode and a pulse voltage to be added to the bias voltage such that the gate signal periodically has a higher voltage than the breakdown voltage only during a period of time in which the pulse voltage is added.

15. A single-photon detection apparatus in an optical quantum communication system, comprising:
one or more processors; and
an execution memory for storing at least one program that is executed by the one or more processors,
wherein the at least one program is configured to generate an output signal through a photon detector from an incoming light signal to detect a photon, generate a negative voltage comparison result through a negative voltage comparator by comparing a negative reference voltage, which is preset in the negative voltage comparator, with a negative voltage included in the output signal, and generate a photon detection result based on the negative voltage comparison result,
wherein when a breakdown current of the photon detector is produced, a photon detection result indicating that a photon has been detected is generated due to a change in the negative voltage of the output signal.

* * * * *